US012704226B2

(12) United States Patent
Egeland et al.

(10) Patent No.: US 12,704,226 B2
(45) Date of Patent: Aug. 11, 2026

(54) INTENTIONALLY CHOKED FLOW DURING AN INITIAL PHASE OF A COMPRESSIBLE FLUID FILLING OPERATION

(71) Applicant: CNX Resources Corporation, Canonsburg, PA (US)

(72) Inventors: Kevin Robert Egeland, Pittsburgh, PA (US); Joseph Michael Fink, Washington, PA (US)

(73) Assignee: CNX Resources Corporation, Canonsburg, PA (US)

( * ) Notice: Subject to any disclaimer, the term of this patent is extended or adjusted under 35 U.S.C. 154(b) by 0 days.

(21) Appl. No.: 18/942,182

(22) Filed: Nov. 8, 2024

(65) Prior Publication Data

US 2026/0132890 A1 May 14, 2026

(51) Int. Cl.
*F17C 5/06* (2006.01)
*F17C 5/00* (2006.01)

(52) U.S. Cl.
CPC ................ *F17C 5/06* (2013.01); *F17C 5/002* (2013.01); *F17C 2205/0326* (2013.01); *F17C 2205/0352* (2013.01); *F17C 2221/033* (2013.01); *F17C 2227/0341* (2013.01); *F17C 2250/034* (2013.01); *F17C 2250/043* (2013.01); *F17C 2250/0636* (2013.01)

(58) Field of Classification Search
CPC .... F17C 5/06; F17C 5/002; F17C 2205/0326; F17C 2205/0352; F17C 2221/033; F17C 2227/0341; F17C 2250/034; F17C 2250/043; F17C 2250/0636
USPC .......................................................... 141/1
See application file for complete search history.

(56) References Cited

U.S. PATENT DOCUMENTS

2013/0008557 A1 1/2013 Cohen
2013/0037165 A1* 2/2013 Okawachi ............ F17C 13/026 141/83
2013/0056111 A1 3/2013 White
(Continued)

FOREIGN PATENT DOCUMENTS

CN 216046901 U 3/2022
KR 10-1615673 B1 4/2016

OTHER PUBLICATIONS

International Search Report for International Patent Application No. PCT/US2025/054371 mailed Mar. 18, 2026.
(Continued)

*Primary Examiner* — Christopher M Afful
(74) *Attorney, Agent, or Firm* — K&L Gates LLP

(57) ABSTRACT

A system includes a storage tank and a feed line that supplies a compressible fluid from a high-pressure source to a plurality of fluid lines in fluid communication with the storage tank. The plurality of fluid lines includes a first fluid line having a first inner diameter sized to create choked flow conditions of the compressible fluid in the first fluid line at an outlet of the first fluid line and a second fluid line having a second inner diameter greater than the first inner diameter. The system further includes a first valve in fluid communication with the second fluid line and a control circuit in electronic communication with the first valve. The control circuit actuates the first valve to control a flow of the compressible fluid through an outlet of the second fluid line.

20 Claims, 9 Drawing Sheets

(56) References Cited

U.S. PATENT DOCUMENTS

| | | | | |
|---|---|---|---|---|
| 2016/0097363 | A1* | 4/2016 | Murray, Sr. ............... | F17C 5/02 137/13 |
| 2017/0241592 | A1 | 8/2017 | Whiteman et al. | |

OTHER PUBLICATIONS

Written Opinion for International Patent Application No. PCT/US2025/054371 mailed Mar. 18, 2026.

* cited by examiner

INTENTIONALLY CHOKED FLOW DURING AN INITIAL PHASE OF A COMPRESSIBLE FLUID FILLING OPERATION

TECHNICAL FIELD

The present disclosure relates to systems, assemblies, and methods for carrying out compressible fluid dispensing operations, such as compressed natural gas (CNG) dispensing operations. Specifically, the disclosed systems, assemblies, and methods advantageously prevent problematically low temperatures of a high-pressure fluid stream at an outlet of a dispensing line without employing process heat.

BACKGROUND

During a compressible fluid dispensing operation, a high-pressure fluid stream is transported into a compressible fluid storage tank through dispensing lines. In some cases, a natural gas stream is delivered from a wellpad of a natural gas well to a compressed natural gas (CNG) storage tank. As such, the dispensing lines that transport the high-pressure fluid may include a number of pipes and hoses, as well as control valves that may be utilized to throttle excess pressure, limit the flow rate of the fluid stream, or maintain sufficient backpressure on equipment upstream.

Commonly, a natural gas stream may include a pressure of at least 4,000 psig at the wellpad while a CNG storage tank may initially include a pressure of as low as 200 psig. As understood by those of ordinary skill in the art, the fluid stream may reduce in pressure as the stream flows through the dispensing lines. This reduction in pressure results in a reduction in temperature of the compressible fluid stream. Accordingly, since the compressible fluid stream continually loses pressure as it flows though the dispensing lines, the coldest point in the dispensing lines is at their outlets. If no methods for mitigating the outlet temperature is employed, a compressible fluid dispensing operation may easily produce outlet temperatures far below the minimum temperature ratings of the pipes and hoses of the dispensing lines.

In the case of a CNG dispensing operation transporting a high-pressure natural gas from a wellpad, the low outlet temperatures of the pipes and hoses of the dispensing lines during the initial phase of a CNG dispensing operation may be mitigated by temporarily heating the natural gas stream in the dispensing line. However, CNG storage tanks typically reach undesirably high temperatures near the end of a CNG dispensing operation, and thus, adding heat to the natural gas stream during an earlier phase of the CNG dispensing operation may only exacerbate this problem.

SUMMARY

In a first embodiment, the present disclosure describes a system including a storage tank and a feed line that supplies a compressible fluid from a high-pressure source to a plurality of fluid lines in fluid communication with the storage tank. The plurality of fluid lines includes a first fluid line having a first inner diameter sized to create choked flow conditions of the compressible fluid in the first fluid line at an outlet of the first fluid line and a second fluid line having a second inner diameter greater than the first inner diameter. The system further includes a first valve in fluid communication with the second fluid line and a control circuit in electronic communication with the first valve. The control circuit actuates the first valve to control a flow of the compressible fluid through an outlet of the second fluid line.

In conjunction with one or more embodiments of the first embodiment, the system further includes a second valve in fluid communication with the feed line. The control circuit is in electronic communication with the second valve and actuates the second valve to control a flow rate of the compressible fluid exiting an outlet of the feed line.

In conjunction with one or more embodiments of the first embodiment, which may be combined with one or more previously recited aspects of the first embodiment, the system further includes a second valve in fluid communication with the second fluid line. The control circuit is in electronic communication with the second valve and actuates the second valve to control a flow rate of the compressible fluid exiting the outlet of the second fluid line.

In conjunction with one or more embodiments of the first embodiment, which may be combined with one or more previously recited aspects of the first embodiment, the plurality of fluid lines further includes additional fluid lines. One or more additional fluid lines include an inner diameter equal to the first inner diameter.

In conjunction with one or more embodiments of the first embodiment, which may be combined with one or more previously recited aspects of the first embodiment, the system further includes a sensor in electronic communication with the control circuit and coupled to the storage tank. The control circuit actuates the first valve and the second valve based at least in part on a signal transmitted by the sensor in response to the sensor measuring a predetermined pressure within the storage tank.

In conjunction with one or more embodiments of the first embodiment, which may be combined with one or more previously recited aspects of the first embodiment, the system further includes a chiller in thermal communication with the feed line. The chiller reduces a temperature of the compressible fluid within the feed line.

In a second embodiment, the present disclosure describes an assembly including a plurality of systems and a control circuit. Each system includes a storage tank and a feed line that supplies a compressible fluid from a high-pressure source to a plurality of fluid lines in fluid communication with the storage tank. The plurality of fluid lines includes a first fluid line having a first inner diameter sized to create choked flow conditions of the compressible fluid in the first fluid line at an outlet of the first fluid line and a second fluid line having a second inner diameter greater than the first inner diameter. The system further includes a first valve in fluid communication with the second fluid line and a control circuit in electronic communication with the first valve of each system. The control circuit actuates each first valve independently to control a flow of the compressible fluid through an outlet of each second fluid line.

In conjunction with one or more embodiments of the second embodiment, each system further includes a second valve in fluid communication with the feed line of the system. The control circuit is in electronic communication with the second valve of each system and actuates each second valve independently to control a flow rate of the compressible fluid exiting an outlet of each feed line.

In conjunction with one or more embodiments of the second embodiment, which may be combined with one or more previously recited aspects of the second embodiment, each system further includes a second valve in fluid communication with the second fluid line of the system. The control circuit is in electronic communication with the second valve of each system and actuates each second valve independently to control a flow rate of the compressible fluid exiting an outlet of each second fluid line.

In conjunction with one or more embodiments of the second embodiment, which may be combined with one or more previously recited aspects of the second embodiment, the plurality of fluid lines of one or more systems further includes additional fluid lines. One or more additional fluid lines include an inner diameter equal to the first inner diameter.

In conjunction with one or more embodiments of the second embodiment, which may be combined with one or more previously recited aspects of the second embodiment, each system further includes a sensor in electronic communication with the control circuit. The sensor is coupled to the storage tank of the system. The first valve and the second valve of the system are actuated by the control circuit based at least in part on a signal transmitted by the sensor of the system in response to the sensor measuring a predetermined pressure within the storage tank of the system.

In conjunction with one or more embodiments of the second embodiment, which may be combined with one or more previously recited aspects of the second embodiment, each system further comprises a chiller in thermal communication with the feed line of the system. The chiller reduces a temperature of the compressible fluid within the feed line.

In a third embodiment, the present disclosure describes a method that includes supplying a compressible fluid from a high-pressure source to a plurality of fluid lines by a feed line. The plurality of fluid lines delivers the compressible fluid to a storage tank. The plurality of fluid lines includes a first fluid line having a first inner diameter sized to create choked flow conditions of the compressible fluid in the first fluid line at an outlet of the first fluid line and a second fluid line having a second inner diameter greater than the first inner diameter. The method further includes actuating a first valve in fluid communication with the second fluid line, by a control circuit in electronic communication with the first valve, thereby controlling a flow of the compressible fluid through an outlet of the second fluid line.

In conjunction with one or more embodiments of the third embodiment, the method further includes actuating a second valve with the control circuit, thereby controlling a flow rate of the compressible fluid exiting an outlet of the feed line. The second valve is in fluid communication with the feed line and electronic communication with the control circuit.

In conjunction with one or more embodiments of the third embodiment, which may be combined with one or more previously recited aspects of the third embodiment, the method further includes actuating a second valve with the control circuit, thereby controlling a flow rate of the compressible fluid exiting an outlet of the second fluid line. The second valve is in fluid communication with the second fluid line and electronic communication with the control circuit.

In conjunction with one or more embodiments of the third embodiment, which may be combined with one or more previously recited aspects of the third embodiment, the method further includes measuring a pressure within the storage tank by a sensor. The sensor is in electronic communication with the control circuit and coupled to the storage tank. The method further includes transmitting a signal by the sensor to the control circuit subsequent to the sensor measuring a predetermined pressure within the storage tank. The control circuit actuates the first valve and the second valve in response to receiving the signal.

In conjunction with one or more embodiments of the third embodiment, which may be combined with one or more previously recited aspects of the third embodiment, the method further includes, prior to actuating the first valve, preventing a flow of the compressible fluid through the outlet of the second fluid line with the first valve.

In conjunction with one or more embodiments of the third embodiment, which may be combined with one or more previously recited aspects of the third embodiment, the plurality of fluid lines further includes additional fluid lines. One or more additional fluid lines include an inner diameter equal to the first inner diameter.

In conjunction with one or more embodiments of the third embodiment, which may be combined with one or more previously recited aspects of the third embodiment, the plurality of fluid lines delivers the compressible fluid into the storage tank in parallel subsequent to actuation of the first valve.

In conjunction with one or more embodiments of the third embodiment, which may be combined with one or more previously recited aspects of the third embodiment, the method further includes reducing, by a chiller in thermal communication with the feed line, a temperature of the compressible fluid within the feed line subsequent to actuation of the first valve.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
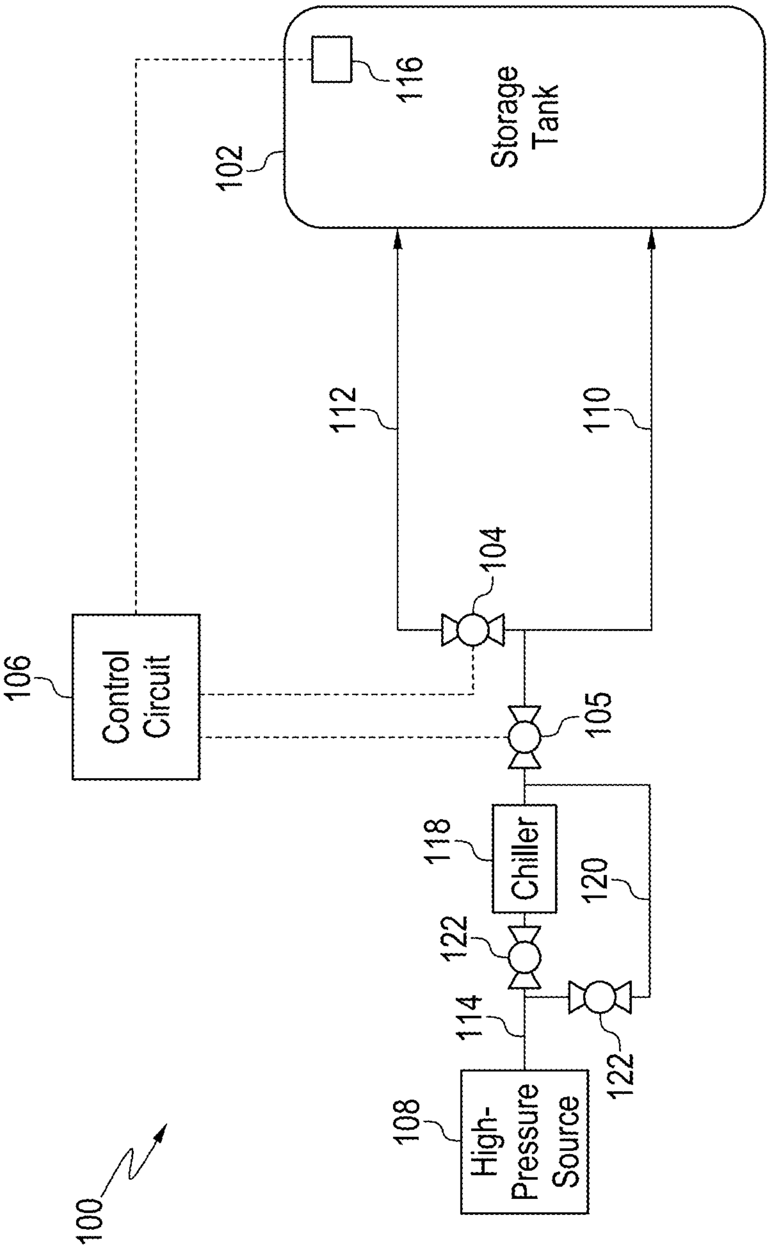

The apparatuses and systems disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 is a schematic diagram illustrating a system according to one or more embodiments of the present disclosure.

Figure 2:
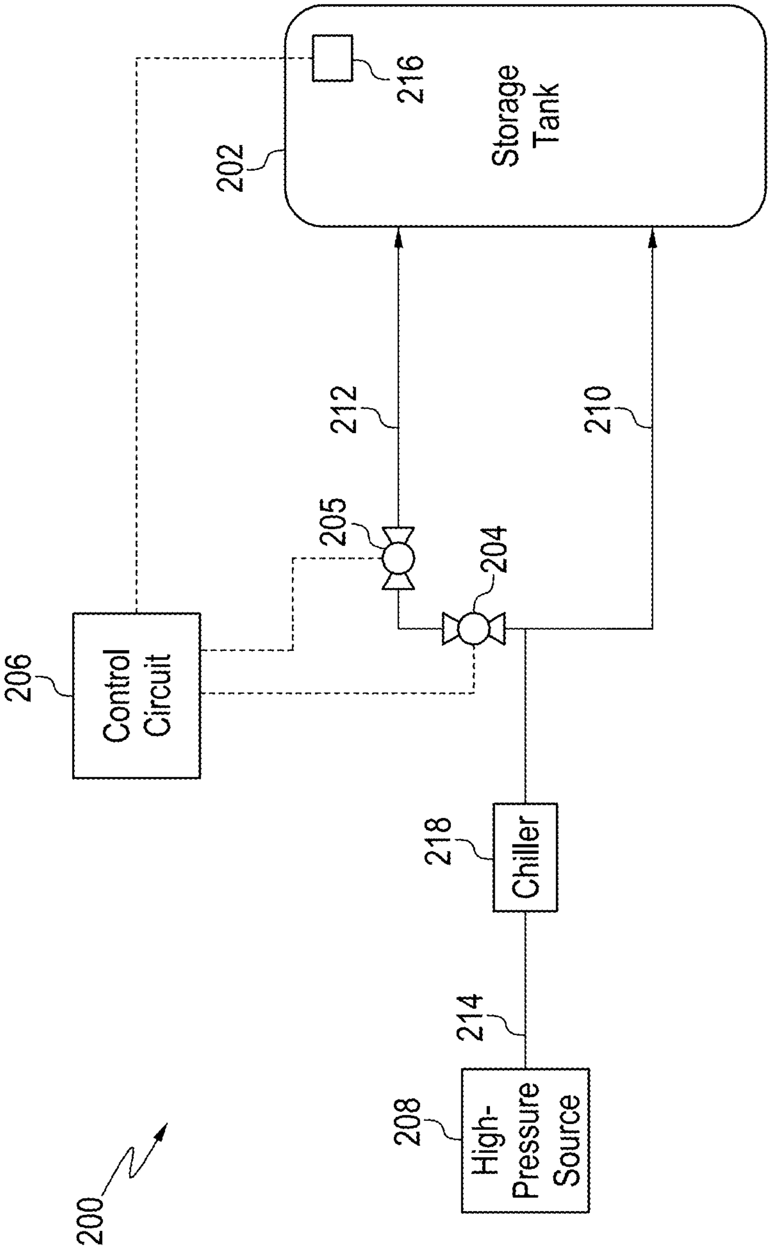

FIG. 2 is a schematic diagram illustrating a system according to one or more embodiments of the present disclosure.

Figure 3:
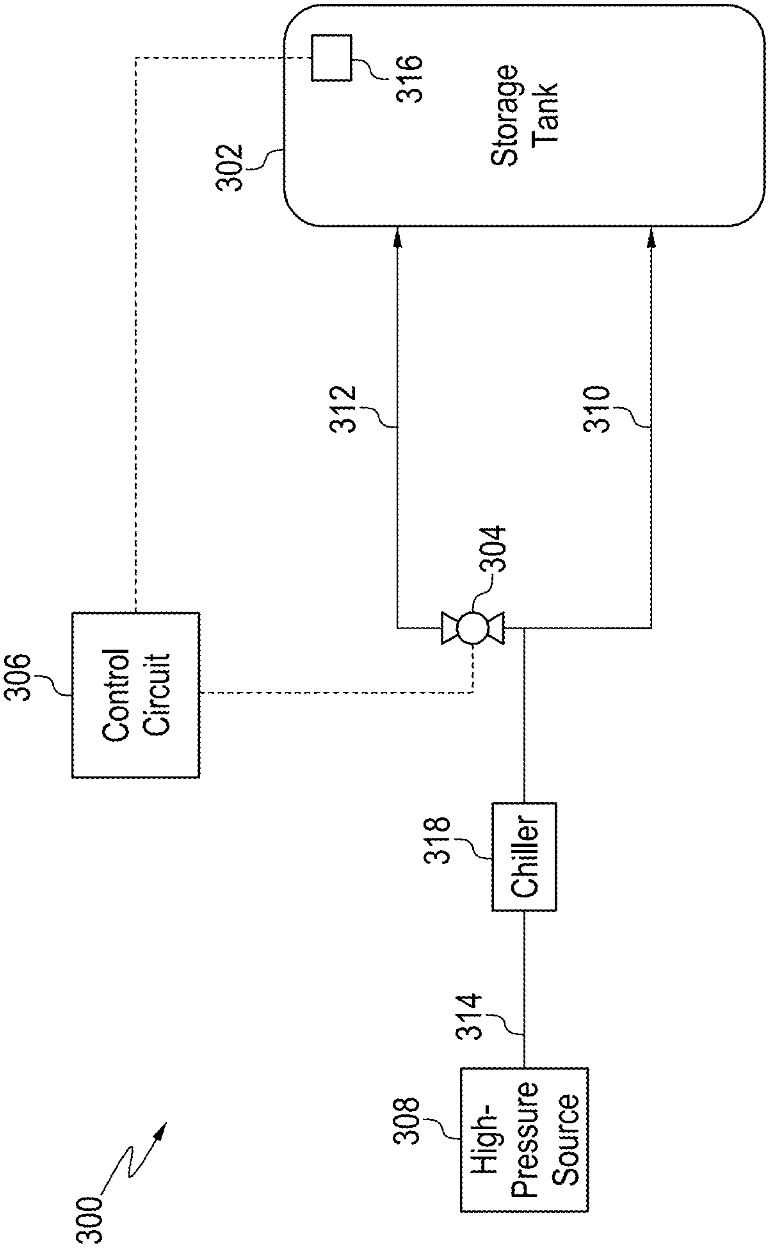

FIG. 3 is a schematic diagram illustrating a system according to one or more embodiments of the present disclosure.

Figure 4:
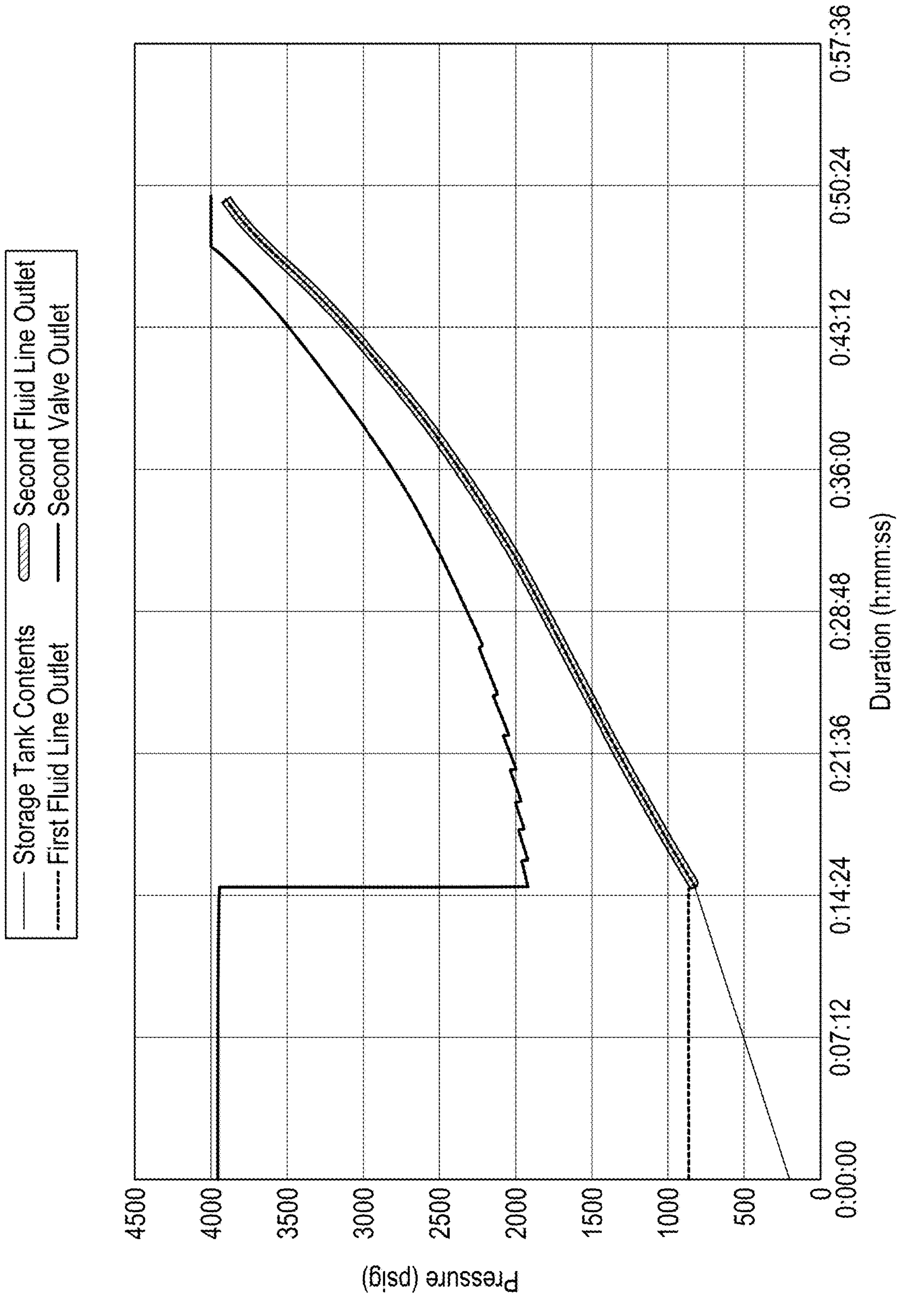

FIG. 4 is a graph depicting example operating pressures during a dispensing procedure according to one or more embodiments of the present disclosure.

Figure 5:
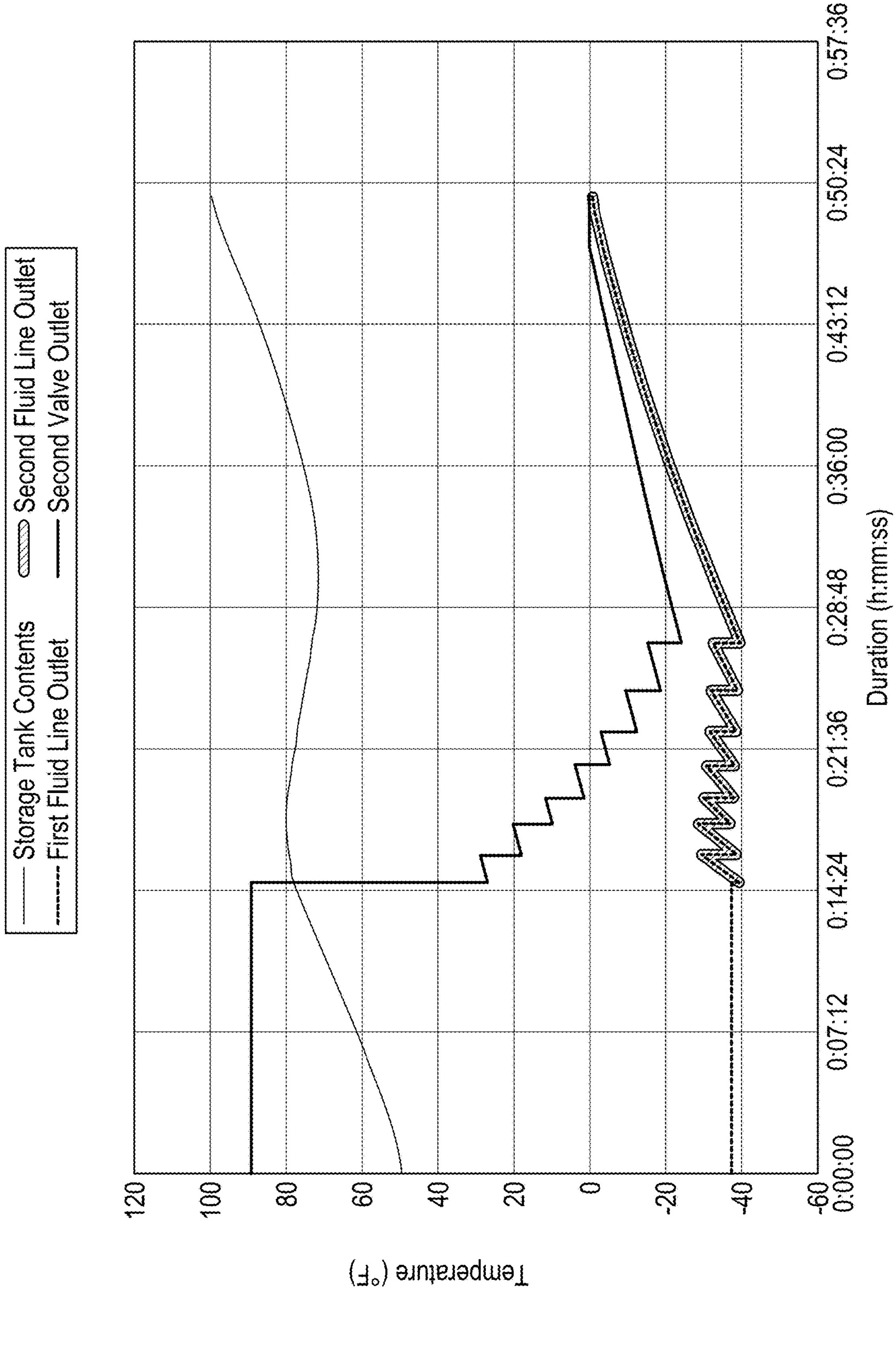

FIG. 5 is a graph depicting example operating temperatures during a dispensing procedure according to one or more embodiments of the present disclosure.

Figure 6:
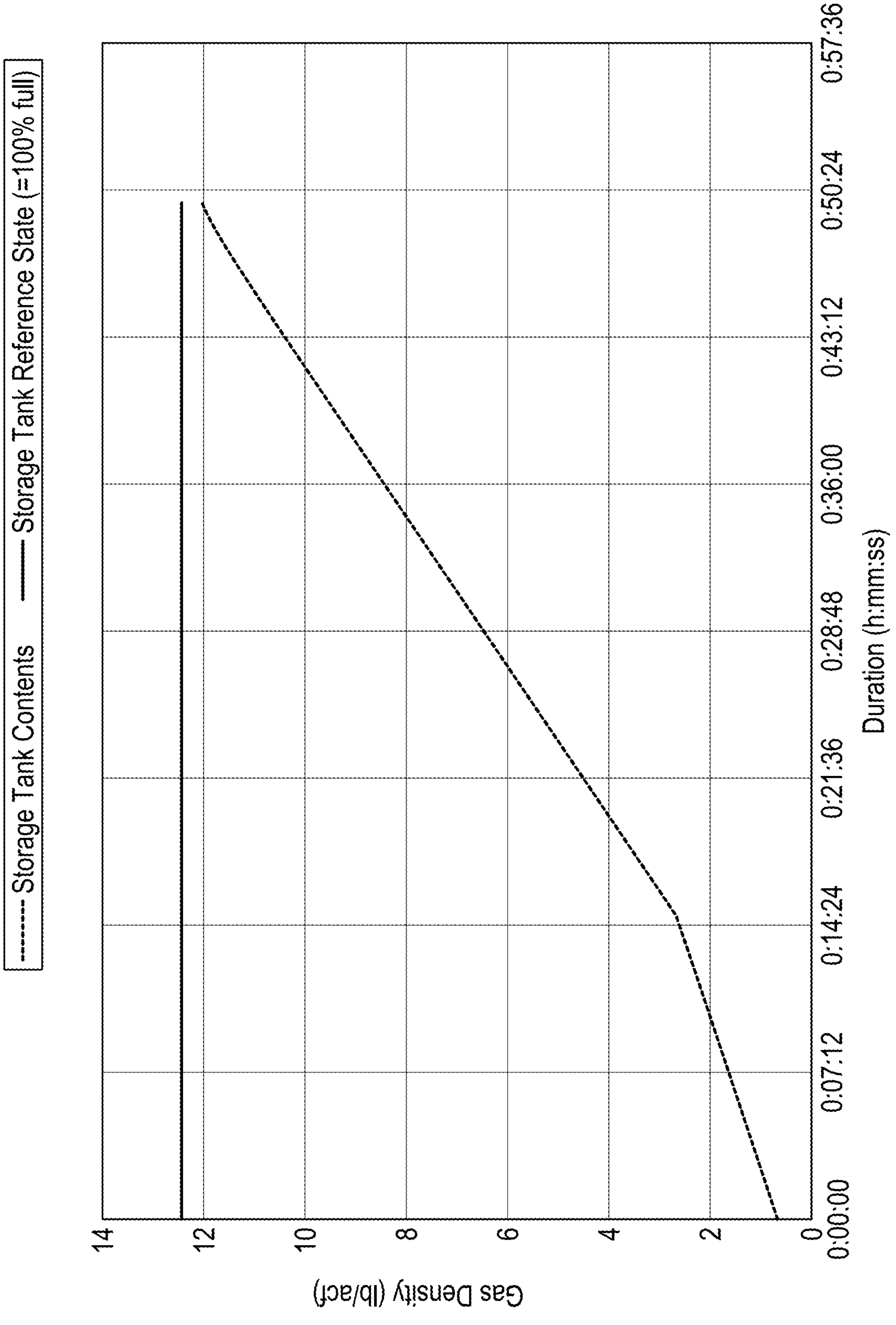

FIG. 6 is a graph depicting an example dispensing progress during a dispensing procedure according to one or more embodiments of the present disclosure.

Figure 7:
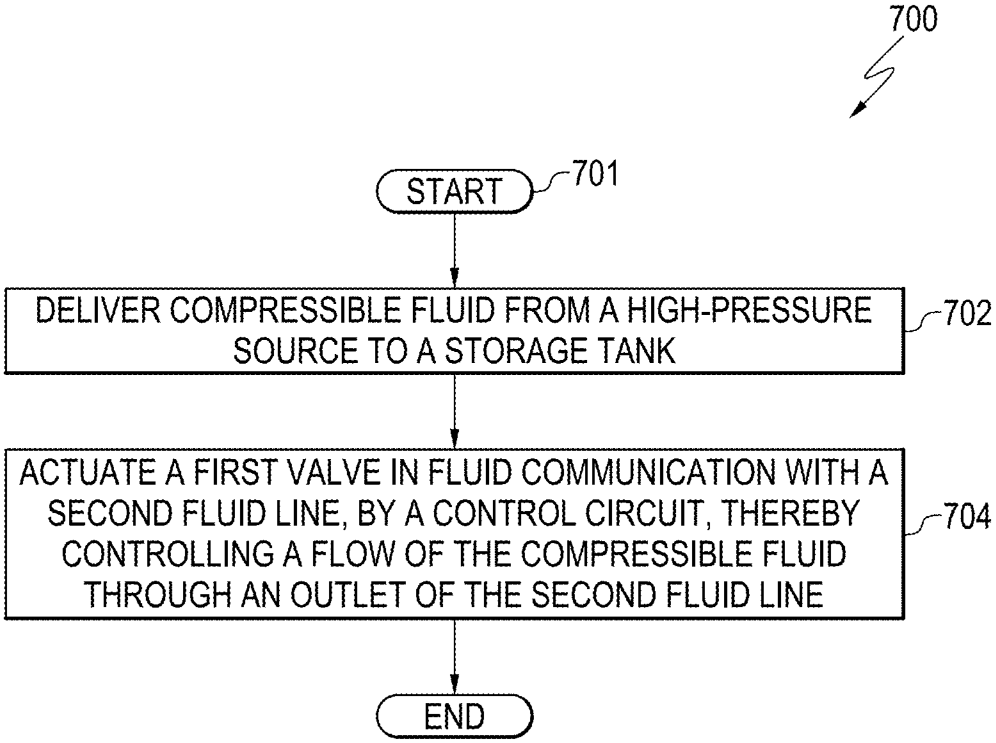

FIG. 7 is flowchart of a method according to one or more embodiments of the present disclosure.

Figure 8:
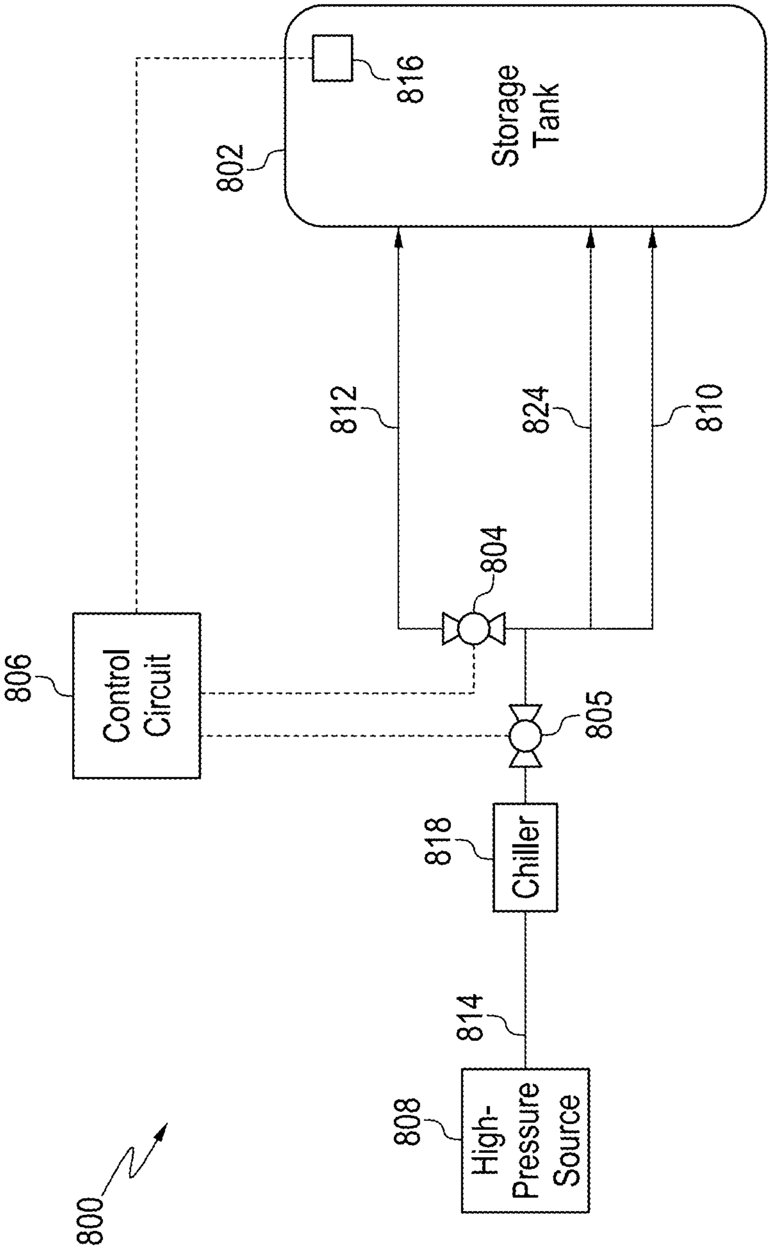

FIG. 8 is a schematic diagram illustrating a system according to one or more embodiments of the present disclosure.

Figure 9:
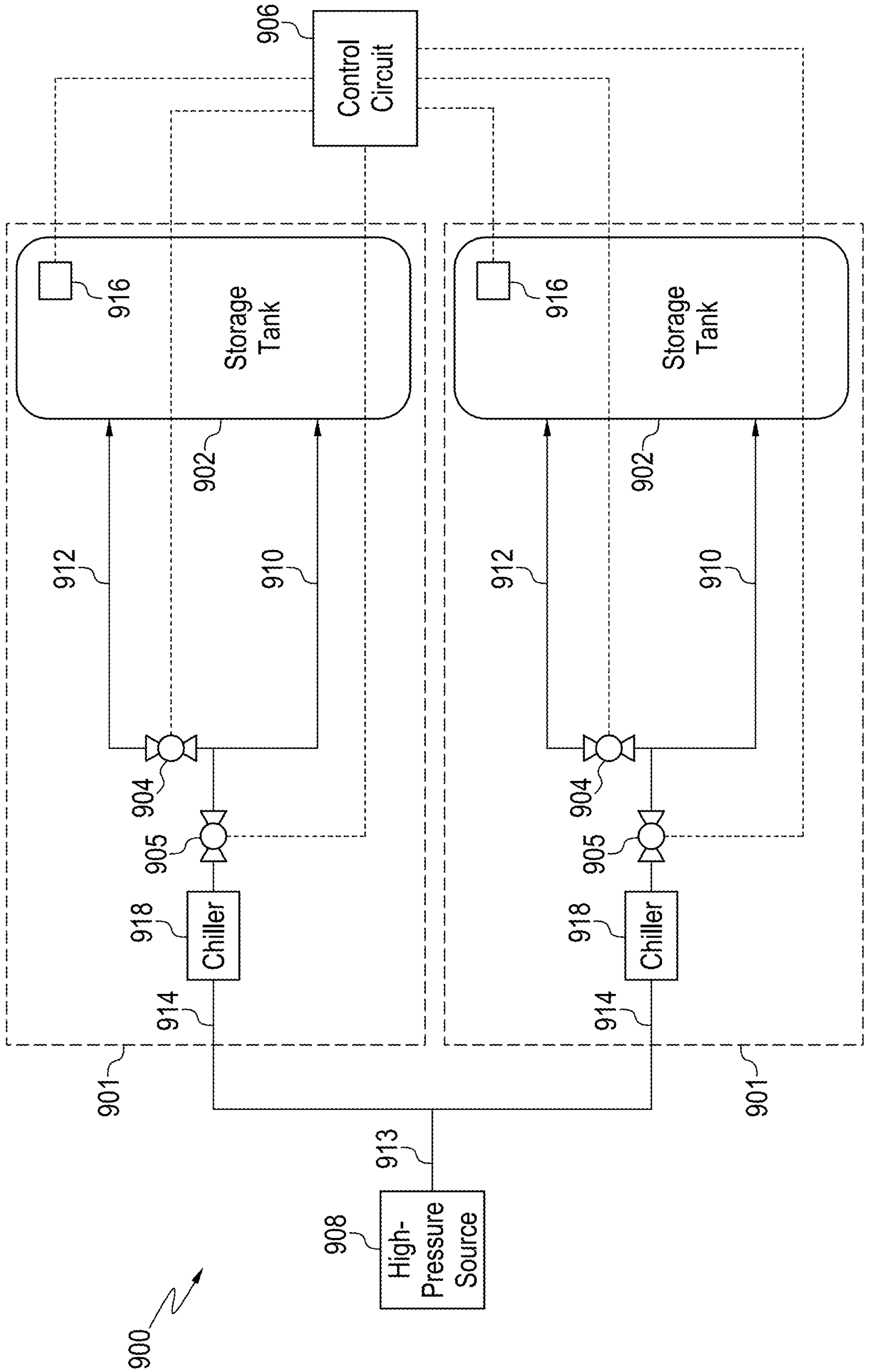

FIG. 9 is a schematic diagram illustrating an assembly according to one or more embodiments of the present disclosure.

DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

In the following description, it is to be understood that such terms as "forward," "rearward," "left," "right," "above," "below," "upward," "downward," and the like are words of convenience and are not to be construed as limiting terms.

FIG. 1 depicts a schematic diagram of a system 100 according to one or more embodiments of the present disclosure. The system 100 may include a plurality of fluid lines, a storage tank 102, a first valve 104, and a control circuit 106. The plurality of fluid lines provides a compressible fluid from a high-pressure source 108 to the storage tank 102. As such, an outlet of each fluid line is in fluid communication with the storage tank 102. In the non-limiting example of FIG. 1, the plurality of fluid lines includes a first fluid line 110 and a second fluid line 112. The first fluid line 110 is designed to include a first inner diameter and the second fluid line 112 is designed to include a second inner diameter which is larger than the first diameter. The first inner diameter is sized to create choked flow conditions of the compressible fluid at the outlet of the first fluid line 110 as the fluid is transported towards the storage tank 102. That is, the first inner diameter is sized such that the speed of the fluid exiting the outlet of the first fluid line 110 is approximately the speed of sound (i.e., Mach 1). At this condition, the flow rate and outlet pressure of the first fluid line 110 will be independent of the pressure of the storage tank 102. Consequently, the first inner diameter may be sized such that, at a predetermined inlet pressure, the fluid within the first fluid line 110 maintains a predetermined flow rate and a predetermined outlet temperature that is above a minimum temperature rating of the first fluid line 110.

A feed line 114 supplies a compressible fluid from the high-pressure source 108 to the plurality of fluid lines. As such, a compressible fluid from the high-pressure source 108 may be split at an outlet of the feed line 114 and directed downstream to each fluid line of the plurality of fluid lines. The feed line 114 and the plurality of fluid lines may be formed of piping, hosing, or an equivalent form of conduit. In addition, the feed line 114 and the plurality of fluid lines may be formed of a polymer, metal, or an equivalent material known to those of ordinary skill in the art which is designed to withstand the temperatures and pressures associated with compressible fluid dispensing operations, such as a CNG dispensing operation.

In one or more embodiments, the storage tank 102 may be a sealed rigid container, a stationary tank, a mobile trailer, or an equivalent device known to those of ordinary skill in the art. In one or more embodiments, the fluid directed into the storage tank 102 may include compressed natural gas, which the industry defines as CNG. In one or more embodiments, the high-pressure source 108 may include a common CNG facility that sources natural gas from distribution pipelines. The CNG facility may compress the CNG from a pipeline pressure as low as 50 psig up to pressures of approximately 5,000 psig prior to the CNG being fed from the high-pressure source 108 to the system 100. Alternatively, in one or more embodiments, the high-pressure source 108 may direct "naturally compressed natural gas" into the system 100. That is, the CNG transported from the high-pressure source 108 into the system 100 may be produced from a natural gas well by a process that does not employ external or human-made compression. Specifically, the compressible fluid entering the system 100 from the high-pressure source 108 may be a stream of natural gas that was produced from a wellbore of the well, separated from liquid, sand, and debris, and substantially removed of water vapor at a pressure substantially equal to the wellhead pressure, thereby preserving the naturally high pressure of the well for use in CNG dispensing operations. There is significant reduction of capital, operating costs, and emissions associated with eliminating the compression element of producing CNG and allowing the wellhead pressure to provide the pressure necessary to fill CNG storage tanks 102 or high-pressure pipelines.

The storage tank 102 may include one or more sensors 116 which monitor a pressure within the storage tank 102. The one or more sensors 116 may be in electronic communication with a control circuit 106 of the system 100. As compressible fluid is transported into the storage tank 102 from the plurality of fluid lines, the pressure within the storage tank 102 increases. Accordingly, the one or more sensors 116 may trigger an audible or visual alert notifying an operator that a predetermined pressure within the storage tank 102 has been met. Alternatively, the one or more sensors 116 may communicate a signal to the control circuit 106 indicating that a predetermined pressure within the storage tank 102 has been met. In response, the control circuit 106 may actuate a first valve 104 in fluid communication with the second fluid line 112.

The first valve 104 controls a flow of the fluid located within the second fluid line 112. When the first valve 104 is in a closed configuration, the first valve 104 prevents the fluid within the second fluid line 112 from exiting the outlet of the second fluid line 112 and entering the storage tank 102. When the first valve 104 is in an open configuration, the first valve 104 permits the fluid within the second fluid line 112 to exit the outlet of the second fluid line 112 and enter the storage tank 102. The first valve 104 may be a piston valve, a ball valve, a butterfly valve, a gate valve, a choke valve, a needle valve, or the like suitable for operation at pressures up to, for example, 5,000 psig. In addition, the first valve 104 may include an electrical, hydraulic, or pneumatic actuator, such that opening and closing of the first valve 104 can be performed automatically in response to a signal received from the control circuit 106. In one or more embodiments, the actuator of the first valve 104 may be fast-acting and configured to rapidly transition the first valve 104 between open and closed positions.

In one or more embodiments, the first valve 104 may be selectively operated in a manual operation mode. That is, the first valve 104 may be selectively opened or closed manually by rotating a handle of the first valve 104, pressing buttons on the first valve 104, etc. In one or more embodiments, the control circuit 106 may output a notification to a user interface indicating that an operator may manually actuate the first valve 104.

In one or more embodiments, the system includes a second valve 105 that further controls a flow of the fluid through the system 100. The second valve 105 may be a form of flow control valve (e.g., a ball valve, a butterfly valve, a gate valve, a needle valve, etc.) operable to control a flow rate of the fluid. In one or more embodiments, the second valve 105 may be positioned in one or more intermediate positions between a fully open position and a closed position in order to modulate the flow rate of the fluid traveling through one or more portions of the system 100. To this end, the second valve 105 may include an electrical, hydraulic, or pneumatic actuator, operable to modulate the flow rate through the second valve 105 automatically in response to a signal received from the control circuit 106. The actuator of the second valve 105 may be fast-acting and configured to rapidly transition the second valve 105 between open and closed positions.

In one or more embodiments, the second valve 105 may be selectively operated in a manual operation mode. That is, the second valve 105 may be selectively opened, closed, or modulated manually by rotating a handle of the second valve 105, pressing buttons on the second valve 105, etc. In one or more embodiments, the control circuit 106 may output a notification to a user interface indicating that an operator may manually modulate the second valve 105.

In the non-limiting example of FIG. 1, the second valve 105 is in fluid communication with the feed line 114. As such, the second valve 105 may be operable to control a flow rate of the fluid exiting the outlet of the feed line 114 to the plurality of fluid lines.

In one or more embodiments (e.g., FIG. 2), the second valve 105 may be in fluid communication with the second fluid line 112. Accordingly, the second valve 105 may be operable to control a flow rate of the fluid entering the storage tank 102 through the second fluid line 112 when the first valve 104 is in an open position. The second valve 105 may be disposed along the second fluid line 112 upstream or downstream of the first valve 104.

Alternatively, in one or more embodiments (e.g., FIG. 3), the first valve 104 may control a flow rate of the compressible fluid entering the storage tank 102. That is, upon actuation of the first valve 104 to permit a flow of fluid through the first valve 104, the first valve 104 may be positioned in one or more intermediate positions between the open and closed positions in order to control the flow rate at which fluid enters the storage tank 102 through the second fluid line 112.

The control circuit 106 of the system 100 may include at least one processor programmed to execute instructions stored on computer-readable media. The control circuit 106 may communicate with the one or more sensors 116 of the storage tank 102, the first valve 104, the second valve 105, and other components of the system 100 described herein by any suitable wired or wireless communication protocols and interfaces such as 4-20 milliamp HART signal, Ethernet, fiber optics, coaxial, infrared, radio frequency (RF), a universal serial bus (USB), Wi-Fi®, cellular network, or the like. The control circuit 106 may be in communication with a user interface to provide real-time feedback of one or more system 100 components to an operator. For example, the user interface may provide real-time feedback of the pressure within the storage tank 102 and the current positions of the first valve 104 and the second valve 105.

The user interface may take the form of a general computer, a handheld device, a siren, a visual indicator placed a component of the system 100 (e.g., a light bar disposed on the exterior of the storage tank 102), or an equivalent component designed to output information to an operator. The user interface may output alerts when one or more predetermined pressures or temperatures have been recorded, a valve is actuated or recommended to be actuated, a malfunction or obstruction in a valve is detected, maintenance of a component of the system 100 is required, etc.

The system 100 may further include a plurality of additional valves (e.g., a piston valve, a ball valve, a butterfly valve, a gate valve, a choke valve, a needle valve, etc.) and a plurality of additional sensors (e.g., a pressure sensor, a temperature sensor, a flow monitor, etc.) coupled to at least one of the high-pressure source 108, the feed line 114, the plurality of fluid lines, or the storage tank 102. The plurality of additional valves may control the flow of the fluid within the system 100 and may be controlled automatically, manually, or any combination thereof in response to one or more measurements of the plurality of additional sensors. The plurality of additional valves and sensors may be in electronic communication with the control circuit 106. Accordingly, the control circuit 106 may receive signals from the plurality of additional sensors, and based on those signals, transmit a signal to actuate one or more of the additional valves. For example, the high-pressure source 108 may include a shutoff valve that may be manually or automatically closed to halt flow towards the feed line 114. The shutoff valve may be controlled by the control circuit 106 in response to measurements taken by a temperature sensor coupled to the first fluid line 110. If, based on a signal received from the temperature sensor, the control circuit 106 determines that the temperature of the fluid within the first fluid line 110 is below a predetermined minimum temperature, the control circuit 106 may transmit a signal to close the shutoff valve coupled to the high-pressure source 108. By closing the shutoff valve, flow out into the feed line 114 is halted, thereby preventing fluid from advancing downstream.

In one or more embodiments, the system 100 may further include a heat exchanger or a chiller 118 in thermal communication with the feed line 114 or one or more fluid lines of the plurality of fluid lines. In one or more embodiments, the chiller 118 may be disposed upstream of the first valve 104. In the non-limiting example of FIG. 1, the chiller 118 is in thermal communication with the feed line 114 and disposed upstream of the second valve 105. However, in one or more embodiments the chiller 118 or an additional chiller 118 may be disposed downstream of the second valve 105. As such, the chiller 118 of FIG. 1 reduces the temperature of the fluid within the feed line 114 prior to the fluid within the feed line 114 being split at the outlet of the feed line 114. In one or more embodiments, the chiller 118 may be employed to reduce the temperature of the fluid within the feed line 114 subsequent to the actuation of the first valve 104.

In one or more embodiments, at least a portion of fluid may bypass the chiller 118 via a bypass line 120 coupled to the feed line 114 upstream of the chiller 118. The bypass line 120 may again couple to the feed line 114 or one or more fluid lines downstream of the chiller 118. In order to achieve a desired mixture temperature of the fluid at the point where the bypass line 120 couples to the feed line 114 downstream of the chiller 118, one or more bypass valves 122 may control the split of fluid between the feed line 114 and the bypass line 120 upstream of the chiller 118. In some instances, the one or more bypass valves 122 may prevent the flow of fluid through the bypass line 120 in order to achieve maximum chilling of the fluid. In other instances, the one or more bypass valves 122 may direct the flow of fluid through the bypass line 120 such that no fluid flows through the chiller 118 in order to minimize the temperature reduction of the fluid flowing through the system. Moreover, the desired mixture temperature may be dependent on the outlet pressure of one or more fluid lines. As such, the one or more bypass valves 122 may be in electronic communication with the control circuit 106. In this way, the control circuit 106 may be operable to adjust the mixture temperature in response to the changing pressure in the storage tank 102 by controlling the actuation of the one or more bypass valves 122.

Each bypass valve 122 may be a same type of valve suitable for operation at pressures up to, for example, 5,000 psig (e.g., a piston valve, a ball valve, a butterfly valve, a gate valve, choke valve, a needle valve, etc). In one or more embodiments, the one or more bypass valves may be a combination of different types of valves. In addition, each bypass valve 122 may include an electrical, hydraulic, or pneumatic actuator, such that opening and closing of each bypass valve 122 can be performed automatically in response to a signal received from the control circuit 106.

FIGS. 4-6 present graphs which illustrate example conditions during a CNG dispensing operation employing a system 100 according to one or more embodiments of the present disclosure (e.g., FIG. 1). Specifically, FIGS. 4-6 respectively depict graphs of example operating pressures, operating temperatures, and dispensing progress during a CNG dispensing operation.

FIG. 7 depicts a logic flow diagram of a method 700 according to one or more embodiments of the present disclosure. Specifically, the method 700 describes a CNG dispensing operation employing a system 100 according to one or more embodiments of the present disclosure (e.g., FIG. 1). While the various flowchart steps in FIG. 7 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

At the start 701, one or more additional valves, such as a shutoff valve, at the high-pressure source 108 or coupled to the plurality of fluid lines may be in a closed configuration, thereby preventing fluid from entering the storage tank 102. As depicted in FIGS. 4 and 5, the storage tank 102 may initially be nominally empty of fluid (i.e., having a minimum pressure, such as approximately 200 psig), and may have a temperature substantially equal to a typical ambient air temperature (e.g., approximately 50° F.). In addition, in this non-limiting example, the fluid entering the system 100 from the high-pressure source 108 includes a pressure of approximately 4000 psig and a temperature of approximately 90° F. In one or more embodiments, an operator or a control circuit 106 of the system 100 may determine and control the pressure and the temperature of the fluid at the high-pressure source 108 entering the system 100.

An initial or first phase of the dispensing operation begins by delivering 702 a compressible fluid from a high-pressure source 108 to a plurality of fluid lines in fluid communication with a storage tank 102 by way of a feed line 114. In one or more embodiments, a shutoff valve of the system 100 may be placed in an open configuration, thereby permitting fluid communication between the high-pressure source 108 and the storage tank 102. The plurality of fluid lines includes a first fluid line 110 having a first inner diameter and a second fluid line 112 having a second fluid diameter that is greater than the first inner diameter. A first valve 104 in fluid communication with the second fluid line 112 is in a closed configuration, thereby preventing fluid from entering the storage tank 102 through the outlet of the second fluid line 112 during the first phase of the dispensing operation. In this way, fluid is directed into the storage tank 102 through the outlet of the first fluid line 110.

In one or more embodiments, a flow rate of the compressible fluid at the outlet of the feed line 114 remains at a constant value during the first phase of the dispensing operation. In one or more embodiments, the flow rate of the fluid at the outlet of the feed line 114 may be modulated in response to temperature or pressure changes of the fluid measured within the system 100 in order to maintain a predicted temperature at the outlet of the first fluid line 110 (e.g., at a temperature above the minimum temperature rating of the first fluid line 110) during the first phase of the dispensing operation. As discussed above, the flow rate of the fluid at the outlet of the feed line 114 may be controlled by a second valve 105 as the fluid is transported downstream towards the storage tank 102.

In one or more embodiments, the pressure at the outlet of the first fluid line 110 remains at a constant value which is greater than the pressure within the storage tank 102. As discussed above, the first inner diameter of the first fluid line 110 is sized to create choked flow conditions of the compressible fluid disposed within the first fluid line 110 at the outlet of the first fluid line 110 as the fluid is transported into the storage tank 102. In addition, the first inner diameter may be sized such that a temperature at the outlet of the first fluid line 110 is within a predetermined range above the minimum temperature rating of the first fluid line 110. By selecting the first inner diameter to create choked flow conditions of the compressible fluid within the first fluid line 110 at a temperature slightly above the minimum temperature rating of the first fluid line 110, the flow rate of the fluid exiting the outlet of the first fluid line 110 during the first phase of the dispensing operation is designed to be as high as possible. As depicted in FIGS. 4 and 5, the pressure and the temperature of the fluid at the outlet of the first fluid line 110 may be approximately 900 psig and −38° F. during the first phase of the dispensing operation. In this non-limiting example, the minimum temperature rating of the first fluid line 110 may be approximately −40° F. While the temperature of the fluid entering the storage tank 102 may be lower than the temperature of the contents within the storage tank 102, the temperature within the storage tank 102 may increase during this first phase of the dispensing operation due to the internal energy increasing within the storage tank 102, as understood by those of ordinary skill in the art.

The first phase of the dispensing operation may continue until a predetermined pressure within the storage tank 102 is met, at which point the second phase of the dispensing operation begins. In the second phase of the dispensing operation, one or more sensors 116 coupled to the storage tank 102 may emit or transmit a notification to an operator or the control circuit 106 that the predetermined pressure within the storage tank 102 has been met. In response, the first valve 104 in fluid communication with the second fluid line 112 may be actuated 704 and placed in an open configuration manually by the operator or automatically by the control circuit 106.

In one or more embodiments (e.g., FIG. 1), a second valve 105 in fluid communication with the feed line 114 may be actuated manually by the operator or automatically by the control circuit 106 in order to increase the flow rate through the outlet of the feed line 114. In one or more embodiments, the first valve 104 and the second valve 105 may be actuated 704 simultaneously.

In one or more embodiments, the control circuit 106 may utilize proportional-integral-derivative (PID) logic to continuously or repeatedly receive measurement signals from the one or more sensors 116 of the storage tank 102 and subsequently actuate the first valve 104 and the second valve 105 in response to a predetermined measurement. In addition, the control circuit 106 may utilize PID logic to continuously or repeatedly receive measurement signals from additional sensors of the system 100 and subsequently actuate additional valves to maintain desired pressures, temperatures, and flow rates within the plurality of fluid lines or the feed line 114 in the manner described herein.

In the example dispensing operation depicted in FIGS. 4-6, the first valve 104 and a second valve 105 are actuated in response to a predetermined pressure of approximately 820 psig being measured within the storage tank 102. Subsequent to the first valve 104 being actuated, compressible fluid is permitted to enter the storage tank 102 through both the first fluid line 110 and the second fluid line 112. As such, a pressure differential between the outlet of the second valve 105 and the outlets of the plurality of fluid lines reduces significantly as depicted in FIG. 4. This is caused by the reduction in resistance due to the plurality of fluid lines now permitting a parallel flow path.

The reduction in pressure at the outlet of the second valve 105 subsequent to the actuation of the first valve 104 may also lead to a reduction in temperature at the outlet of the second valve 105, as seen in FIG. 5. In one or more embodiments, a chiller 118 of the system 100 may be employed to progressively lower the temperature of the fluid entering the second valve 105 subsequent to the first valve 104 being placed in an open configuration. That is, the chiller 118 may progressively reduce the temperature of the fluid exiting the feed line 114 until the chiller reaches a minimum process outlet temperature (e.g., 0° F.).

In one or more embodiments, the chiller 118 may incrementally reduce the temperature of the fluid exiting the feed line 114. For example, the chiller 118 may reduce the temperature of the fluid exiting the feed line 114 in 10° F. increments, as seen in FIG. 5. Each incremental reduction in temperature by the chiller 118 may be timed such that the outlets of the plurality of fluid lines are maintained within a predetermined range above their minimum temperature ratings (e.g., −40° F.) until the chiller 118 reaches a minimum process outlet temperature (e.g., 0° F.).

In one or more embodiments, the second valve 105 may be modulated during the second phase of the dispensing operation in response to measurements recorded by the one or more sensors 116 of the storage tank 102 and by the plurality of additional sensors until the second valve 105 is in a fully open configuration. In one or more embodiments, when the outlet pressure of the second valve 105 reaches a terminal pressure, or a pressure substantially equal to the pressure of the compressible fluid entering the feed line 114 from the high-pressure source 108, the outlet pressure of the second valve 105 cannot further increase as the second valve 105 is in the fully open configuration. Consequently, when the outlet pressure of the second valve 105 reaches the terminal pressure (e.g., approximately 4000 psig), the pressure differential between the storage tank 102 and the outlet of the second valve 105 rapidly declines, as can be seen in FIG. 4.

In one or more embodiments, the dispensing operation may conclude subsequent to the one or more sensors 116 of the storage tank 102 measuring a stoppage threshold of one or more characteristics of the contents within the storage tanks 102 (e.g., a predetermined maximum pressure, a predetermined maximum temperature, a predetermined gas density, etc.). In one or more embodiments, the dispensing operation may conclude subsequent to the pressure differential between the outlet of the first valve 104 and the outlet of the second valve 105 reaching a predetermined threshold, as depicted in FIG. 4. In the example dispensing operation, the dispensing operation concludes subsequent to the pressure differential between the storage tank 102 and the outlet of the second valve 105 measuring approximately 100 psig.

As seen in FIG. 6, the example dispensing operation fills the storage tank 102 to approximately 97% capacity by the end of the dispensing operation (i.e., when the pressure differential between the outlet of the first valve 104 and the outlet of the second valve 105 falls to approximately 100 psig). The slope of the gas density within the storage tank 102 is directly proportional to the rate of fill of the storage tank 102. Thus, it is apparent that the first phase of the dispensing operation includes a slower fill rate than the full rate achieved during the second phase of the dispensing operation. The pressure increase within the storage tank 102 accelerates during the second phase of the dispensing operation as the storage tank 102 receives a higher flow rate of fluid through the plurality of fluid lines, as seen in FIG. 4. The second inner diameter of the second fluid line 112 permits a sufficiently high flow rate in the second fluid line 112 as the storage tank 102 approaches the terminal pressure (e.g., approximately 4000 psig). In contrast, if merely the first fluid line 110 were utilized during the dispensing operation, the first inner diameter of the first fluid line 110 may result in the flow rate being significantly constrained as the pressure within the storage tank 102 approached the terminal pressure.

FIG. 8 depicts a schematic diagram of a system 800 according to one or more additional embodiments of the present disclosure. Components shown in FIGS. 1-3 have not been redescribed for purposes of readability and have the same description and purpose as outlined above. In this non-limiting embodiment, the plurality of fluid lines of the system 800 further includes one or more additional fluid lines 824 in fluid communication with the storage tank 802. As such, the compressible fluid from the high-pressure source 808 may be split at the outlet of the feed line 814 and directed downstream to the first fluid line 810, the second fluid line 812, and one or more additional fluid lines 824.

In one or more embodiments, one or more additional fluid lines 824 may include an inner diameter equal to the first inner diameter. In this way, the inner diameters of the one or more additional fluid lines 824 create choked flow conditions for the compressible fluid within the additional fluid lines 824 as the fluid exits the outlets of the additional fluid lines 824 and enters the storage tank 802. Thus, during the first phase of a dispensing operation (i.e., while the first valve 804 is in the closed configuration), the rate at which the storage tank 802 is filled may be increased by utilizing one or more additional fluid lines 824 in addition to the first fluid line 810.

In one or more embodiments, one or more additional fluid lines 824 may include an inner diameter greater than the first inner diameter. Further, in one or more embodiments, the system 800 may include additional valves coupled to the additional fluid lines 824 to control the flow of the fluid through the one or more additional fluid lines 824. Accordingly, the additional valves may prevent the flow of fluid through the one or more additional fluid lines 824 during the first phase of a dispensing operation (i.e., while the first valve 804 is in the closed configuration) and permit the flow of fluid through the one or more additional fluid lines 824 during the second phase of the dispensing operation (i.e., while the first valve 804 is in the open configuration). In this way, the rate at which the storage tank 802 is filled may be increased by utilizing one or more additional fluid lines 824 in addition to the first fluid line 810 and the second fluid line 812.

FIG. 9 depicts a schematic diagram of an assembly 900 according to one or more additional embodiments of the present disclosure. Components shown in FIGS. 1-3 and 8 have not been redescribed for purposes of readability and have the same description and purpose as outlined above. In one or more embodiments, the assembly 900 may include a plurality of systems 901 as described above in FIGS. 1-3 and 8. In the non-limiting example of FIG. 9, the assembly 900 includes a first system 901 and a second system 901. However, the assembly 900 may include a greater number of systems 901.

Each system 901 includes a storage tank 902, a plurality of fluid lines, and a first valve 904 coupled to a second fluid line 912. In one or more embodiments, each system 901 may further include a feed line 914 that receives compressible fluid from a same high-pressure source 908 of the system 901. Alternatively, the fluid from the high-pressure source 908 may be split at an outlet of a main feed line 913 and directed downstream to the feed lines 914 of each system 901. In one or more embodiments, each system 901 further includes a second valve 905 in fluid communication with the feed line 914 or the second fluid line 912 of the system 901.

In one or more embodiments, each system 901 may further include a chiller 918 in thermal communication with the feed line 914. In one or more embodiments, the chillers 918 of each system 901 may operate independently based on measurements recorded by one or more additional sensors coupled to the respective systems 901. In one or more embodiments, one or more chillers 918 may be in thermal communication with the feed lines 914 of multiple systems 901. For example, a first chiller 918 may be utilized to reduce the temperature of the fluid within a first set of systems 901 and an additional chiller 918 may be utilized to reduce the temperature of the fluid within an additional set of systems 901.

In one or more embodiments, each system 901 may further include a control circuit 906 in electronic communication with the first valve 904, the second valve 905, and the one or more sensors 916 of the storage tank 902. The control circuit 906 of each system 901 may also be in electronic communication with additional valves and additional sensors of the system 901. Alternatively, and as shown in FIG. 9, the assembly 900 may include a single control circuit 906 in electronic communication with the first valve 904, the second valve 905, and the one or more sensors 916 of the storage tank 902 of each system 901 of the assembly 900. As such, a single control circuit 906 of the assembly 900 may also be in electronic communication with the additional valves and the additional sensors of each system 901. In one or more embodiments, the single control circuit 906 of the assembly 900 may control each system 901 independently. For example, the single control circuit 906 may only actuate the first valve 904 and the second valve 905 of the first system 901 based on signals received from the one or more sensors 916 of the first system 901 and may only actuate the first valve 904 and the second valve 905 of the second system 901 based on signals received from the one or more sensors 916 of the second system 901.

While various embodiments of systems 100, 200, 300, 800, 901, assemblies 900, and methods 700 were provided in the foregoing description, those skilled in the art may make modifications and alterations to these aspects without departing from the scope the claimed subject matter appended hereto. For example, it is to be understood that this disclosure contemplates that, to the extent possible, one or more features of any aspect can be combined with one or more features of any other aspect. As another non-limiting specific example, because natural gas is often odorless, as those of ordinary skill in the art will appreciate it is customary to add an odorant, such as ethyl mercaptan, so that a gas leak can be detected anywhere the gas is being processed or consumed. Therefore, such an odorant can be added to any of the gas products produced in accordance with the present disclosure. Accordingly, the foregoing description is intended to be illustrative rather than restrictive. The scope of the embodiments and aspects thereof described hereinabove are defined by the appended claims, and all changes to the embodiments and aspects thereof that fall within the meaning and the range of equivalency of the claims are to be embraced within their scope.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted being prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system comprising:
- a storage tank;
- a feed line configured to supply a compressible fluid from a high-pressure source to a plurality of fluid lines in fluid communication with the storage tank, the plurality of fluid lines comprising:
  - a first fluid line having a first inner diameter sized to create choked flow conditions of the compressible fluid in the first fluid line at an outlet of the first fluid line; and
  - a second fluid line having a second inner diameter greater than the first inner diameter;
- a first valve in fluid communication with the second fluid line; and
- a control circuit in electronic communication with the first valve, the control circuit configured to actuate the first valve to control a flow of the compressible fluid through an outlet of the second fluid line.

2. The system of claim 1, further comprising:
- a second valve in fluid communication with the feed line;
- wherein the control circuit is in electronic communication with the second valve and configured to actuate the second valve to control a flow rate of the compressible fluid exiting an outlet of the feed line.

3. The system of claim 1, further comprising:

a second valve in fluid communication with the second fluid line;

wherein the control circuit is in electronic communication with the second valve and configured to actuate the second valve to control a flow rate of the compressible fluid exiting the outlet of the second fluid line.

4. The system of claim 1, wherein the plurality of fluid lines further comprises additional fluid lines, wherein one or more additional fluid lines comprise an inner diameter equal to the first inner diameter.

5. The system of claim 2, further comprising a sensor in electronic communication with the control circuit and coupled to the storage tank, wherein the control circuit is configured to actuate the first valve and the second valve based at least in part on a signal transmitted by the sensor in response to the sensor measuring a predetermined pressure within the storage tank.

6. The system of claim 1, further comprising a chiller in thermal communication with the feed line, the chiller configured to reduce a temperature of the compressible fluid within the feed line.

7. An assembly comprising:

a plurality of systems, each system comprising:

a storage tank;

a feed line configured to supply a compressible fluid from a high-pressure source to a plurality of fluid lines in fluid communication with the storage tank, the plurality of fluid lines comprising:

a first fluid line having a first inner diameter sized to create choked flow conditions of the compressible fluid in the first fluid line at an outlet of the first fluid line; and a second fluid line having a second inner diameter greater than the first inner diameter; and a first valve in fluid communication with the second fluid line; and a control circuit in electronic communication with the first valve of each system, the control circuit configured to actuate each first valve independently to control a flow of the compressible fluid through an outlet of each second fluid line.

8. The assembly of claim 7, wherein each system further comprises a second valve in fluid communication with the feed line of the system, and wherein the control circuit is in electronic communication with the second valve of each system and configured to actuate each second valve independently to control a flow rate of the compressible fluid exiting an outlet of each feed line.

9. The assembly of claim 7, wherein each system further comprises a second valve in fluid communication with the second fluid line of the system, and wherein the control circuit is in electronic communication with the second valve of each system and configured to actuate each second valve independently to control a flow rate of the compressible fluid exiting an outlet of each second fluid line.

10. The assembly of claim 7, wherein the plurality of fluid lines of one or more systems further comprises additional fluid lines, wherein one or more additional fluid lines comprise an inner diameter equal to the first inner diameter.

11. The assembly of claim 8, wherein each system further comprises:

a sensor in electronic communication with the control circuit, the sensor being coupled to the storage tank of the system;

wherein the first valve and the second valve of the system are actuated by the control circuit based at least in part on a signal transmitted by the sensor of the system in response to the sensor measuring a predetermined pressure within the storage tank of the system.

12. The assembly of claim 7, wherein each system further comprises a chiller in thermal communication with the feed line of the system, the chiller configured to reduce a temperature of the compressible fluid within the feed line.

13. A method comprising:

supplying a compressible fluid from a high-pressure source to a plurality of fluid lines by a feed line, the plurality of fluid lines configured to deliver the compressible fluid to a storage tank, the plurality of fluid lines comprising:

a first fluid line having a first inner diameter sized to create choked flow conditions of the compressible fluid in the first fluid line at an outlet of the first fluid line; and a second fluid line having a second inner diameter greater than the first inner diameter; and actuating a first valve in fluid communication with the second fluid line, by a control circuit in electronic communication with the first valve, thereby controlling a flow of the compressible fluid through an outlet of the second fluid line.

14. The method of claim 13, further comprising actuating, by the control circuit, a second valve in fluid communication with the feed line and electronic communication with the control circuit, thereby controlling a flow rate of the compressible fluid exiting an outlet of the feed line.

15. The method of claim 13, further comprising actuating, by the control circuit, a second valve in fluid communication with the second fluid line and electronic communication with the control circuit, thereby controlling a flow rate of the compressible fluid exiting an outlet of the second fluid line.

16. The method of claim 14, further comprising:

measuring, by a sensor in electronic communication with the control circuit and coupled to the storage tank, a pressure within the storage tank; and transmitting, by the sensor, a signal to the control circuit subsequent to the sensor measuring a predetermined pressure within the storage tank;

wherein the control circuit actuates the first valve and the second valve in response to receiving the signal.

17. The method of claim 13, further comprising, prior to actuating the first valve, preventing a flow of the compressible fluid through the outlet of the second fluid line with the first valve.

18. The method of claim 13, wherein the plurality of fluid lines further comprises additional fluid lines, wherein one or more additional fluid lines comprise an inner diameter equal to the first inner diameter.

19. The method of claim 13, wherein the plurality of fluid lines delivers the compressible fluid into the storage tank in parallel subsequent to actuation of the first valve.

20. The method of claim 13, further comprising reducing, by a chiller in thermal communication with the feed line, a temperature of the compressible fluid within the feed line subsequent to actuation of the first valve.

* * * * *